United States Patent
Kuo

(10) Patent No.: US 10,838,543 B2
(45) Date of Patent: Nov. 17, 2020

(54) METHOD FOR TRANSMITTING CONTINUOUS DATA BY DATA COMPRESSION

(71) Applicant: PEGATRON CORPORATION, Taipei (TW)

(72) Inventor: Sheng-Fu Kuo, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 54 days.

(21) Appl. No.: 16/286,457

(22) Filed: Feb. 26, 2019

(65) Prior Publication Data
US 2019/0278417 A1    Sep. 12, 2019

(30) Foreign Application Priority Data
Mar. 8, 2018   (TW) .............................. 107107837 A

(51) Int. Cl.
| | | |
|---|---|---|
| G06F 3/041 | (2006.01) | |
| G06F 3/0488 | (2013.01) | |
| G06K 9/00 | (2006.01) | |
| H04L 29/08 | (2006.01) | |

(52) U.S. Cl.
CPC ........ G06F 3/0416 (2013.01); G06F 3/04162 (2019.05); G06F 3/04883 (2013.01); G06K 9/00416 (2013.01); H04L 67/025 (2013.01)

(58) Field of Classification Search
CPC .............. G06K 9/00416; G06F 3/0416; G06F 3/04162; G06F 3/04883; H04L 67/025
See application file for complete search history.

(56) References Cited

U.S. PATENT DOCUMENTS 5,528,003 A * 6/1996 Bodin .................. G06F 3/0383
                                                      172/18
2013/0314349 A1  11/2013  Chien
2016/0117023 A1   4/2016  Hotelling
(Continued)

FOREIGN PATENT DOCUMENTS

| EP | 1 526 701 A1 | 4/2005 |
| EP | 1 764 980 A1 | 3/2007 |
| JP | 2015-201034 A | 11/2015 |

(Continued)

OTHER PUBLICATIONS

Microsoft, Ink Serialized Format (ISF) Specification, pp. 1-48, XP002792626, Dec. 31, 2007.

*Primary Examiner* — Yaron Cohen
(74) *Attorney, Agent, or Firm* — Winston Hsu

(57) ABSTRACT

A method for transmitting continuous data from a transmitter includes sensing a continuous touch trace on the touch device of the transmitter, generating touch data of the continuous touch trace according to sensing time, generating an initial point frame and a stroke frame according to the touch data of the continuous touch trace, transmitting the initial point frame and the stroke frame to a receiver. The initial point frame includes a first initial tag, coordinates of an initial point, and a terminating tag. The stroke frame includes a second initial tag, a plurality of offset data frames, and a total number of the offset data frames. Each offset data frame includes a horizontal offset value relative to a previous horizontal coordinate and a vertical offset value relative to a previous vertical coordinate.

12 Claims, 4 Drawing Sheets

(56) References Cited

U.S. PATENT DOCUMENTS

2018/0069962 A1\* 3/2018 Kato ................. H04M 3/567

FOREIGN PATENT DOCUMENTS

| JP | 2015-201035 | A | 11/2015 |
| KR | 10-2016-0087825 | A | 7/2016 |
| TW | 201403408 | A | 1/2014 |
| TW | I541691 | B | 7/2016 |
| TW | I569176 | B | 2/2017 |
| WO | 2015/164019 | A1 | 10/2015 |
| WO | 2018/011963 | A1 | 1/2018 |

\* cited by examiner

METHOD FOR TRANSMITTING CONTINUOUS DATA BY DATA COMPRESSION

CROSS REFERENCE TO RELATED APPLICATION

This application claims priority of Taiwan application No. 107107837, which was filed on Mar. 8, 2018, and is included herein by reference.

BACKGROUND

1. Technology Field

The present invention is related to a method for transmitting continuous data, and more particularly, to a method for transmitting continuous data by data compression.

2. Description of the Prior Art

With the development of electronic technology, it has become a trend to store various characters and images in electronic forms. For example, the user can draw a pattern or take notes by hand on the touchpad through a stylus and convert it into an electronic file for storage. Consequently, the electronic file can be easily retrieved to share with others and edited. In the prior art, a touchpad transmits the touch coordinates of the stylus on the touchpad and the corresponding stroke pressure information to the storage device for subsequent process. If the content recorded by the user on the touchpad is rather complicated, the touchpad will transmit a large amount of coordinate data and corresponding stroke pressure data, resulting in a large amount of bandwidth usage and power consumption during the transmission process. In addition, due to the large amount of data, the storage device can only store the final work after the process, and cannot record the sequential trace created during the painting or the calligraphy concurrently.

SUMMARY

One embodiment of the present invention discloses a method for transmitting the continuous data from a transmitter. The transmitter includes a touch device.

The method includes sensing a continuous touch trace on the touch device, generating touch data of the continuous touch trace according to sensing time, generating an initial point frame according to the touch data of the continuous touch trace, generating a first stroke frame according to the touch data of the continuous touch trace, and transmitting the initial point frame and the first stroke frame to a receiver.

The touch data of the continuous touch trace includes coordinates of a first point and coordinates of a plurality of second points arranged sequentially according to the sensing time, and the coordinates of the initial point. The initial point frame includes a first initial tag, the coordinates of the initial point, and a first terminating tag, and the coordinates of the initial point include a horizontal coordinate and a vertical coordinate. The first stroke frame includes a second initial tag, a plurality of offset data frames, and a total number of the offset data frames. The offset data frames include a first offset data frame corresponding to the coordinates of the first point and a plurality of second offset data frames corresponding to the coordinates of the second points. The first offset data frame includes a first horizontal offset value and a first vertical offset value of the coordinates of the first point relative to the coordinates of the initial point. Each second offset data frame includes a second horizontal offset value and a second vertical offset value of the coordinates of each second point relative to the coordinates of the previous point.

Another embodiment of the present invention discloses a data transmission system. The data transmission system includes a receiver and a transmitter.

The transmitter includes a touch device for sensing a continuous touch trace and generating touch data of the continuous touch trace according to sensing time. The touch data of the continuous touch trace includes coordinates of a first point and coordinates of a plurality of second points arranged sequentially according to the sensing time, and initial coordinates.

The transmitter generates an initial point frame and a first stroke frame according to the touch data of the continuous touch trace, and transmits the initial point frame and the first stroke frame to a receiver.

The initial point frame includes a first initial tag, the coordinates of the initial point, and a first terminating tag, and the coordinates of the initial point include a horizontal coordinate and a vertical coordinate. The first stroke frame includes a second initial tag, a plurality of offset data frames, and a total number of the offset data frames. The plurality of offset data frames include a first offset data frame corresponding to the coordinates of the first point and a plurality of second offset data frames corresponding to the coordinates of the second points. The first offset data frame includes a first horizontal offset value and a first vertical offset value of the coordinates of the first point relative to the coordinates of the initial point. Each of the plurality of second offset data frames includes a second horizontal offset value and a second vertical offset value of the coordinates of each second point relative to the coordinates of the previous point.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
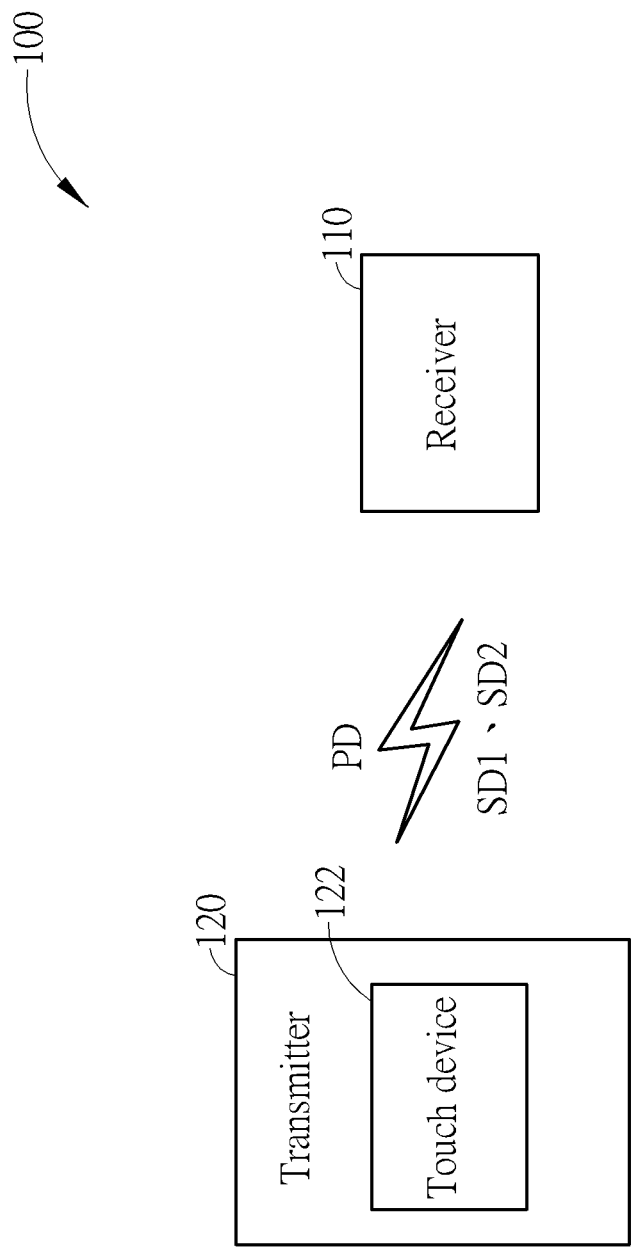
FIG. 1 shows a data transmission system according to one embodiment of the present invention.

FIG. 1 shows a data transmission system 100 according to one embodiment of the present invention. The data transmission system 100 includes a receiver 110 and a transmitter 120. The receiver 110 can be, for example, a computer system or a mobile device, and the transmitter 120 can include, for example, a touch panel, and can include a touch device 122. The transmitter 120 is used for transmitting data while the receiver 110 is used for receiving data.

When the user uses a stylus or a finger to draw or write on the touch panel, the touch device 122 can sense the touch events on the touch panel caused by the stylus or the finger and generate the corresponding touch data. Generally, the content of the user's drawing or writing is composed of a plurality of continuous touch traces. In prior art, the touch device 122 will transmit the coordinates of each point on the continuous touch traces to the storage device for processing. However, the coordinates of two adjacent touch points on the continuous touch trace are usually pretty close. Therefore, in the present invention, the transmitter 120 can transmit the offset between the two adjacent touch points rather than their complete coordinates. Consequently, the amount of the transmission data can be reduced significantly, and it can also be beneficial for subsequent processing and storage.

That is, when the touch device 122 senses the continuous touch trace, the touch device 122 can generate the touch data of the continuous touch trace according to sensing time. The touch data of the continuous touch trace includes the coordinates of the initial point, and the coordinates of the first point and the coordinates of a plurality of second points arranged sequentially according to the sensing time. The transmitter 120 can generate the initial point frame PD and a first stroke frame SD1 according to the touch data of the continuous touch trace, and transmit the initial point frame PD and the first stroke frame SD1 to the receiver 110.

Figure 2:
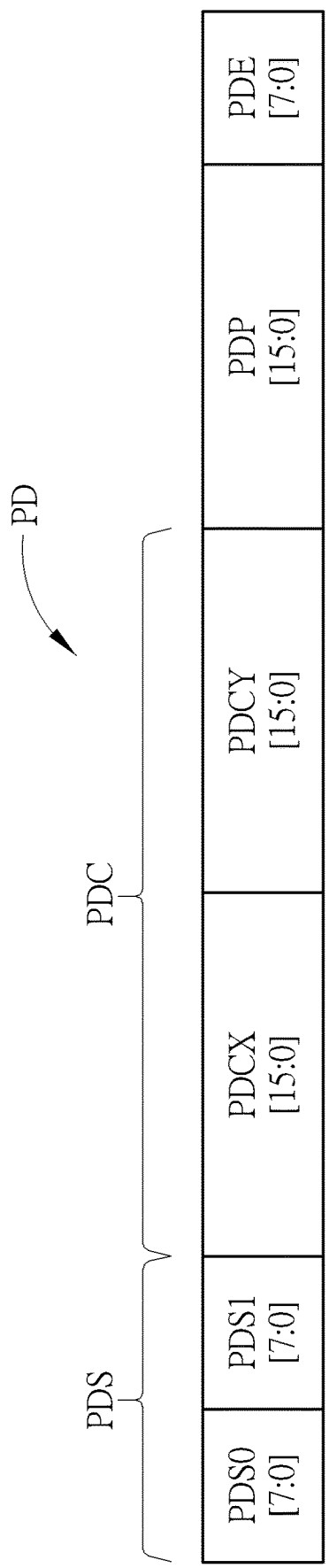
FIG. 2 shows the initial point frame according to one embodiment of the present invention.
Figure 3:
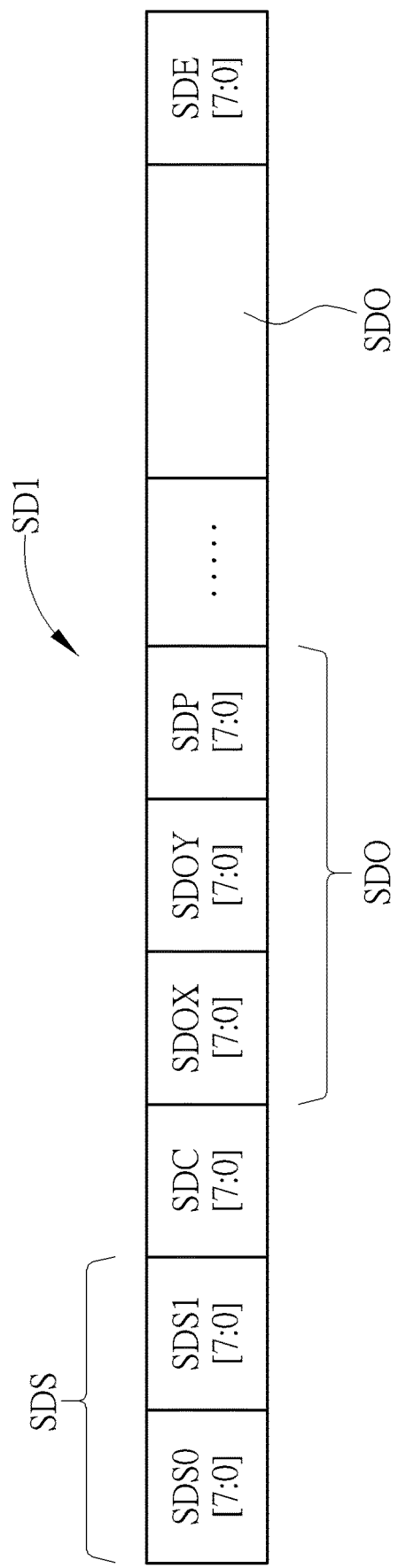
FIG. 3 shows the first stroke frame according to one embodiment of the present invention.

FIG. 2 shows the initial point frame PD according to one embodiment of the present invention, and FIG. 3 shows the first stroke frame SD1 according to one embodiment of the present invention. The initial point frame PD can be used to record the information of the initial point of the continuous touch trace. In FIG. 2, the initial point frame PD includes a first initial tag PDS, the coordinates of the initial point PDC, and a first terminating tag PDE.

The first initial tag PDS can be used to notify the receiver 110 of the type of the transmission data. In some embodiments, the first initial tag PDS may include a first initial byte PDS0 [7:0] and a first initial complement byte PDS1 [7:0] complementary to the first initial byte PDS0 [7:0]. Use of a pair of two complementary bytes can help to identify the type of the transmission data, and ensure the validity of the transmission data. However, the first initial tag PDS is not limited to two complementary bytes in the present invention. In some other embodiments of the present invention, the first initial tag PDS can include the initial byte PDS0 [7:0] only.

The coordinates of the initial point PDC may include a horizontal coordinate PDCX [15:0] and a vertical coordinate PDCY [15:0] of the initial point of the continuous touch trace. In FIG. 2, the horizontal coordinate PDCX [15:0] and the vertical coordinate PDCY [15:0] both have 16 bits; however, in some other embodiments, the horizontal coordinate and the vertical coordinate may include more or less bits.

The first terminating tag PDE is used to notify the receiver 110 that the transmission of the initial point frame PD is about to complete. In some embodiments, the first terminating tag PDE has 8 bits, and may be, for example, a system default value or a check sum.

In FIG. 3, the first stroke frame SD1 may include a second initial tag SDS, a plurality of offset data frames SDO, a total number SDC of the offset data frames, and a second terminating tag SDE.

The second initial tag SDS is used to notify the receiver 110 of the type of the transmission data. In some embodiments, the second initial tag SDS can include a second initial byte SDS0[7:0] and a second initial complement byte SDS1 [7:0] complementary to the second initial byte SDS0[7:0]. Use of a pair of the two complementary bytes can help to identify the type of the transmission data, and ensure the validity of the transmission data. However, the second initial tag SDS is not limited to two complementary bytes in the present invention. In some other embodiments of the present invention, the second initial tag SDS can include the initial byte SDS0[7:0] only.

In addition, in some embodiments, to help the receiver 110 to distinguish the initial point frame PD from the first stroke frame SD1, the first initial byte PDS0[7:0] and the second initial byte SDS0[7:0] may be different.

The total number SDC of the offset data frames can be used to inform the receiver 110 of the total number of the offset data frames that may be received later. For example, the receiver 110 can be informed to receive 1000 offset data frames before the transmission, so the receiver 110 could ensure if all the offset data frames in the first stroke frame SD1 have been received completely later. In FIG. 3, the total number SDC, for example, includes 8 bits of information. Each of the offset data frames may include a horizontal offset value SDOX [7: 0] and a vertical offset value SDOY [7: 0] relative to the coordinates of the previous point. In other words, the offset data frame SDO records the coordination offset between the previous point and the current point. For example, the offset data frames SDO may include a first offset data frame corresponding to the coordinates of first points and a plurality of second offset data frames corresponding to the coordinates of the second points. The first offset data frame includes a first horizontal offset value and a first vertical offset value of the coordinates of the first point relative to the coordinates of the initial point. Also, each second offset data frame includes a second horizontal offset value and a second vertical offset value of the coordinates of each second point relative to the coordinates of the first point.

For example, if the coordinates of the initial point on the continuous touch trace is (100,100), and the coordinates of the point which is the next touch point adjacent to the initial point is (102, 101), then the offset values of the first offset data frame may be represented as (2,1). Similarly, if the coordinates of the second point, at the next point adjacent to the first point is (104, 103), then the offset values of the second offset data frame relative to the coordinates of the first point can be (2,2).

Since the offset data frame SDO can record the offset information between the coordinates of two adjacent points, and the distance between two adjacent points sensed successively within a short period of time is usually rather short, the length of the offset data frame SDO (for example, 16 bits) can be less than the length of the initial coordinates PDC (for example, 32 bits). Consequently, by transmitting the offset data frame SDO instead of the coordinates of each touch point, the amount of data to be transmitted and to be stored can both be reduced significantly.

Furthermore, in some embodiments, one of the bits in the horizontal offset value SDOX [7:0] could be used to indicate the direction of the horizontal offset. For example, but not limited to, 0 represents "LEFT" while 1 represents "RIGHT". Similarly, one of the bits in the vertical offset value SDOY [7:0] could be used to indicate the direction of the vertical offset. For example, but not limited to, 0 represents "UP" while 1 represents "DOWN".

In FIGS. 2 and 3, the initial point frame PD may further include a pressure value PDP for recording the pressure on the touch panel triggered by the user's touch. Also, each of the plurality of offset data frames SDO may further include a pressure offset value SDP relative to a prior pressure value. That is, the initial point frame PD and the first stroke frame SD1 can record the pressure values along with the touch trace for subsequent applications, such as to present the thicknesses of lines according to the pressure values. In FIGS. 2 and 3, the pressure value PDP includes 16 bits of data, and the pressure offset value SDP includes 8 bits of data.

In addition, in some embodiments, when the continuous touch trace starts, the transmitter 120 can activate a counter corresponding to the continuous touch trace for recording the duration of the continuous touch trace. When the continuous touch trace has lasted a predetermined time or when the continuous touch trace has reached a predetermined length, the transmitter 120 is capable of segmenting the continuous touch trace into a plurality of stroke frames, and transmitting those stroke frames to the receiver 110 sequentially. For example, in FIG. 1, when the transmitter 120 transmits the initial point frame PD, the transmitter 120 may further transmit the first stroke frame SD1 and the second stroke frame SD2 according to the touch data of the continuous touch trace. In other words, the transmitter 120 is capable of limiting the total number of the offset data frames in each stroke frame for improving the flexibility of data transmission. For example, when the continuous touch trace lasts too long, the transmitter 120 can package a predetermined number of offset data frames to form a stroke frame every time when the predetermined number of offset data frames have been generated, and transmits the stroke frame to the receiver 110. That is, the touch data of the continuous touch trace can be divided and transmitted in smaller packages before the whole continuous touch trace completes. Therefore, the flexibility and efficiency of the data transmission can be improved.

Since the data transmission system 100 can transmit the offset data frames instead of the coordinates of each touch point on the continuous touch trace, the amount of data to be transmitted can be reduced greatly, and the receiver 110 could store the continuous touch trace on the whole touch panel for subsequent applications, such as presenting the drawing process or the writing process as animation.

Figure 4:
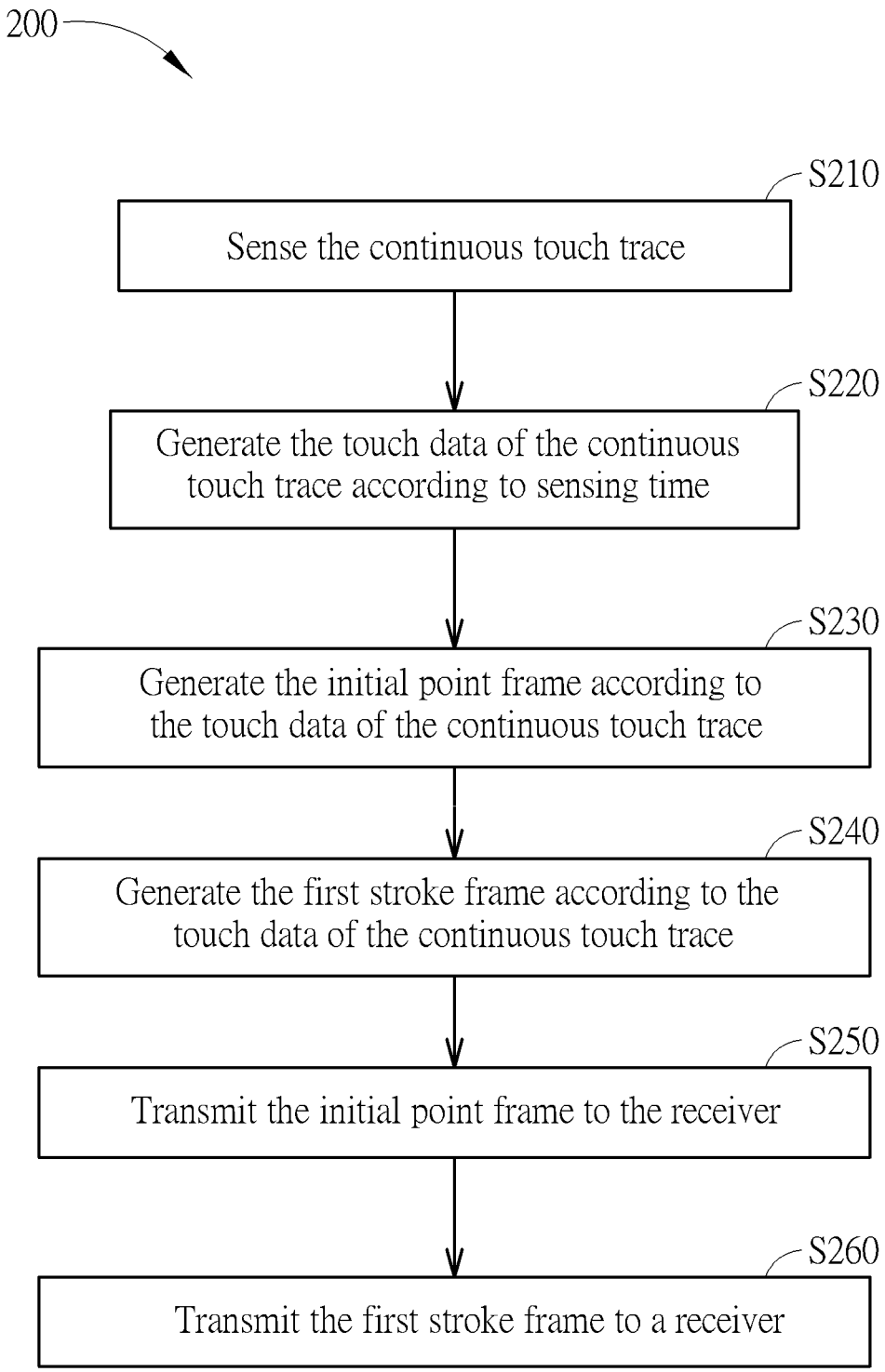
FIG. 4 shows a flow chart of a method for transmitting continuous data according to one embodiment of the present invention.

FIG. 4 shows a flow chart of a method 200 for transmitting continuous data according to one embodiment of the present invention. The method 200 can be applied to the transmitter 120 of the data transmission system 100. The method 200 includes steps S210 to S260, but is not limited to the order shown in FIG. 4.

S210: sense the continuous touch trace;

S220: generate the touch data of the continuous touch trace according to sensing time;

S230: generate the initial point frame PD according to the touch data of the continuous touch trace;

S240: generate the first stroke frame SD1 according to the touch data of the continuous touch trace;

S250: transmit the initial point frame PD to the receiver 110;

S260: transmit the first stroke frame SD1 to a receiver 110.

In step S210, the touch device 122 senses the continuous touch trace on the touch panel touched by the user, and, in step S220, the touch data of the continuous touch trace is generated according to the sensing time of the continuous touch trace. Later in steps S230 and S240, the transmitter 120 generates the initial point frame PD and the first stroke frame SD1 according to the touch data of the continuous touch trace. The initial point frame PD and the first stroke frame SD1 may include the content shown in FIGS. 2 and 3. In steps S250 and S260, the transmitter 120 transmits the initial point frame PD and the first stroke frame SD1 to the receiver 110.

In some embodiments, the transmitter 120 transmits the data to the receiver 110 through wireless communication protocols, such as Bluetooth or Wi-Fi. Since the transmitter 120 transmits a plurality of offset data frames to the receiver 110 at once after the first stroke frame SD1 is generated, the communication time between the transmitter 120 and the receiver 110 would be rather short, avoiding unnecessary power consumption.

In addition, in some embodiments, the transmitter 120 can limit the total number of offset data frames in each stroke frame. Therefore, if the continuous touch trace has lasted longer than a predetermined time or become longer than a predetermined length, then the transmitter 120 is capable of generating more stroke frames according to the touch data of the continuous touch trace and transmitting the touch data of the continuous touch trace to the receiver 110 part by part. Consequently, the flexibility and efficiency of the data transmission can be improved.

In summary, the data transmission system and the method for transmitting continuous data provided by the embodiments of the present invention may transmit the offset data frames instead of the coordinates of each of the points on the continuous touch trace when transmitting the touch data of the continuous touch trace. Therefore, the amount of data to be transmitted is reduced significantly, allowing the receiver to store the continuous traces on the whole page of the touch panel for subsequent applications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for transmitting continuous data from a transmitter, the transmitter comprising a touch device, and the method comprising:

sensing a continuous touch trace on the touch device;

generating touch data of the continuous touch trace according to sensing time, wherein the touch data of the continuous touch trace comprises coordinates of a first point and coordinates of a plurality of second points arranged sequentially according to the sensing time, and coordinates of an initial point;

generating an initial point frame according to the touch data of the continuous touch trace, wherein the initial point frame comprises a first initial tag, the coordinates of the initial point, and a first terminating tag, and the coordinates of the initial point comprise a horizontal coordinate and a vertical coordinate;

generating a first stroke frame according to the touch data of the continuous touch trace, wherein the first stroke frame comprises a second initial tag, a plurality of offset data frames, and a total number of the offset data frames, and the offset data frames comprise:

a first offset data frame corresponding to the coordinates of the first point, the first offset data frame comprising a first horizontal offset value and a first vertical offset value of the coordinates of the first point relative to the coordinates of the initial point; and a plurality of second offset data frames corresponding to the coordinates of the second points, each of the second offset data frames comprising a second horizontal offset value and a second vertical offset value of coordinates of each second point relative to the coordinates of a previous point;

transmitting the initial point frame and the first stroke frame to a receiver; and when the continuous touch trace has lasted a predetermined time or the continuous touch trace has reached a predetermined length, generating a second stroke frame according to the touch data of the continuous touch trace.

2. The method of claim 1, wherein the initial point frame further comprises a pressure value, and each of the offset data frames further comprises a pressure offset value relative to a prior pressure value.

3. The method of claim 1, wherein a length of each of the offset data frames is less than a length of the coordinates of the initial point.

4. The method of claim 1, wherein:
the first initial tag comprises a first initial byte and a first initial complement byte of the first initial byte;
the second initial tag comprises a second initial byte and a second initial complement byte of the second initial byte; and
the first initial byte is different from the second initial byte.

5. The method of claim 1, wherein:
the initial point frame and the first stroke frame is transmitted to the receiver via wireless communications.

6. The method of claim 1, wherein the first stroke frame further comprises a second terminating tag.

7. A data transmission system comprising:
a receiver; and
a transmitter comprising a touch device configured to sense a continuous touch trace, and generate touch data of the continuous touch trace according to sensing time, wherein the touch data of the continuous touch trace comprise coordinates of a first point and coordinates of a plurality of second points arranged sequentially according to the sensing time, and coordinates of an initial point, the transmitter being configured to:
generate an initial point frame and a first stroke frame according to the touch data of the continuous touch trace;
transmit the initial point frame and the first stroke frame to the receiver; and
generate a second stroke frame according to the touch data of the continuous touch trace when the continuous touch trace has lasted a predetermined time or the continuous touch trace has reached a predetermined length;
wherein:
the initial point frame comprises a first initial tag, the coordinates of the initial point, and a first terminating tag, and the coordinates of the initial point comprise a horizontal coordinate and a vertical coordinate; and
the first stroke frame comprises a second initial tag, a plurality of offset data frames, a total number of the offset data frames, and the plurality of offset data frames comprise:
a first offset data frame corresponding to the coordinates of the first point, the first offset data frame comprising a first horizontal offset value and a first vertical offset value of the coordinates of the first point relative to the coordinates of the initial point; and
a plurality of second offset data frames corresponding to the coordinates of the second points, each of the second offset data frames comprising a second horizontal offset value and a second vertical offset value of the coordinates of each second point relative to the coordinates of the previous point.

8. The data transmission system of claim 7, wherein the initial point frame further comprises a pressure value, and each of the offset data frames further comprises a pressure offset value relative to a prior pressure value.

9. The data transmission system of claim 7, wherein a length of each of the offset data frames is less than a length of the coordinates of the initial point.

10. The data transmission system of claim 7, wherein:
the first initial tag comprises a first initial byte and a first initial complement byte of the first initial byte;
the second initial tag comprises a second initial byte and a second initial complement byte of the second initial byte; and
the first initial byte is different from the second initial byte.

11. The data transmission system of claim 7, wherein:
the transmitter transmits the initial point frame and the first stroke frame to the receiver via wireless communications.

12. The data transmission system of claim 7, wherein the first stroke frame further comprises a second terminating tag.

* * * * *